United States Patent [19]
Kanaya et al.

[11] 3,904,929
[45] Sept. 9, 1975

[54] ELECTRO-DISCHARGING SHEET, AND AN ELECTRO-DISCHARGING APPARATUS PROVIDED WITH AN ELECTRO-DISCHARGING ELECTRODE COMPOSED OF THE SAID SHEET, AND A PROCESS FOR ELECTRO-DISCHARGING WITH THE SAID APPARATUS

[75] Inventors: Yoshinosuke Kanaya, Kiryu; Minoru Hasegawa, Ashikaga; Kanae Azuma, Ashikaga; Minoru Ochiai, Ashikaga; Jun Shimizu, Ashikaga, all of Japan

[73] Assignee: Kohkoku Chemical Industry Co., Ltd., Tokyo, Japan

[22] Filed: Nov. 2, 1973

[21] Appl. No.: 412,251

[30] Foreign Application Priority Data

| Nov. 10, 1972 | Japan | 47-112795 |
| Nov. 22, 1972 | Japan | 47-117486 |
| Nov. 22, 1972 | Japan | 47-117487 |
| Aug. 11, 1973 | Japan | 48-90256 |
| Dec. 28, 1972 | Japan | 48-2961 |
| Feb. 19, 1973 | Japan | 48-21345 |
| Mar. 1, 1973 | Japan | 48-26176 |
| Mar. 9, 1973 | Japan | 48-29514 |
| Mar. 24, 1973 | Japan | 48-35643 |
| July 6, 1973 | Japan | 48-80257 |

[52] U.S. Cl. .................. 317/2 R; 317/2 F
[51] Int. Cl. .................. H05f 3/00; H05f 3/02
[58] Field of Search ........... 317/2 R, 2 A, 2 B, 2 C, 317/2 F

[56] References Cited
UNITED STATES PATENTS

| 1,712,294 | 5/1929 | Cox | 317/2 R |
| 2,084,523 | 6/1937 | Crawford | 317/2 R |
| 2,818,534 | 12/1957 | Horne | 317/2 R |
| 3,386,001 | 5/1968 | Slosberg et al. | 317/2 R |
| 3,532,932 | 10/1970 | Simon | 317/2 R |

*Primary Examiner*—L. T. Hix
*Attorney, Agent, or Firm*—Toren, McGeady and Stanger

[57] ABSTRACT

An electro-discharging sheet prepared by applying a carbon black-high molecular resin composition to a base material including woven, unwoven and knit clothes and paper.

16 Claims, 26 Drawing Figures

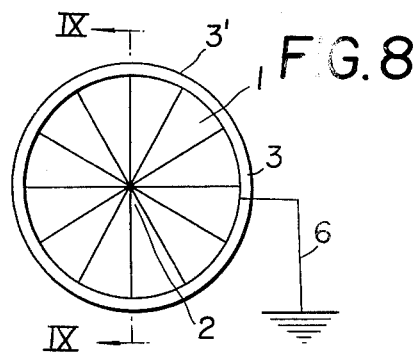
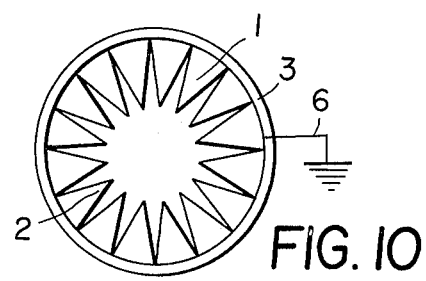
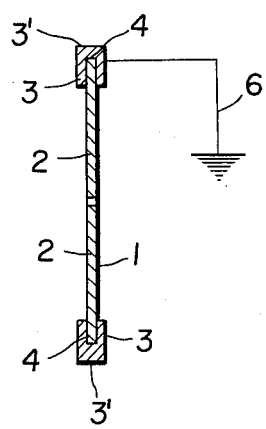
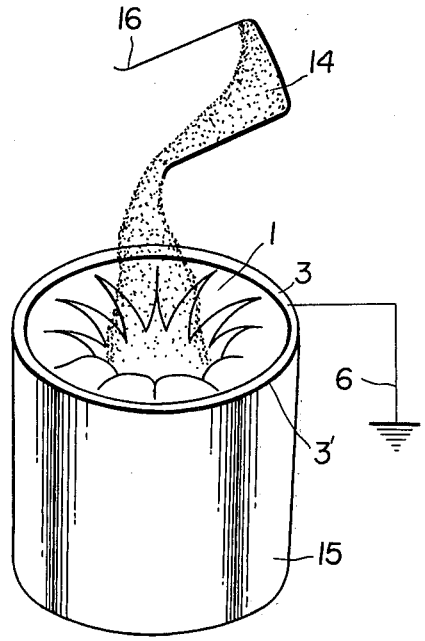
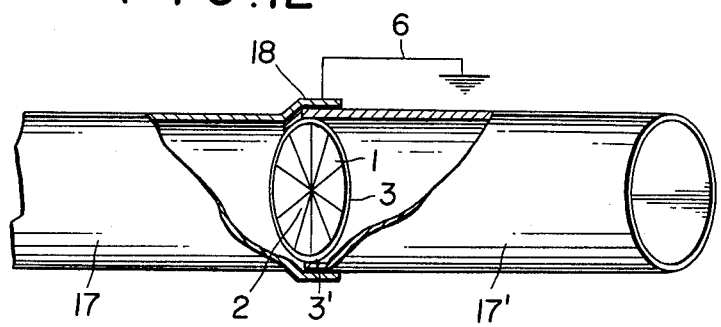

ELECTRO-DISCHARGING SHEET, AND AN ELECTRO-DISCHARGING APPARATUS PROVIDED WITH AN ELECTRO-DISCHARGING ELECTRODE COMPOSED OF THE SAID SHEET, AND A PROCESS FOR ELECTRO-DISCHARGING WITH THE SAID APPARATUS

The present invention relates to an electro-discharging sheet to remove electrostatic charge, and an electro-discharging apparatus provided with an electro-discharging electrode composed of the said electro-discharging sheet, and a process for electro-discharging by electro-autodischarging with the said electro-discharging apparatus.

Hitherto, troubles due to electrostatic charging on industrial materials has been a source of serious problems. For example, in the course of processing synthetic resin films, synthetic resin sheets, woven textures, unwoven sheets, papers or in the operations in which synthetic resin powders or beads are transferred from a vessel to another or transported in a pipe, tremendous quantities of electricity generated by touching or friction is likely to be accumulated on the apparatus and human bodies, as well as on the sheets, powders and beads. Electrostatic discharge that occurs when the surface potential formed by the electrostatic charge exceeds the breakdown potential, gives not only unpleasant feeling such as electric shock to the worker, but also injures the surface of such charging matters as sheets or soils the surface with electrostatically adsorbed dust. Further in an operation where solvents or gases are employed the electrostatic discharge may act as a firing source to bring about a serious accident such as fire and explosion. On the other hand, when bodies in the form of powder or bead are charged electrically, they stick to the inside wall of the pipe in which they are transported and, as a result, a thick layer of them may be formed over a long time of usage, leading to a lowered efficiency in transportation due to smaller effective inside diameter. Further, the powders or the beads are difficult to transfer from one vessel to another because they stick fast to vessels by the electrostatic force.

Similarly, the same kind of troubles due to electrostatic attraction occur also in daily life. Thus, most people have experienced the disagreeable feeling, with which they take off their clothes made of artificial fibers, produced by the discharge of electrostatic charges to the human body that have been generated by friction and accumulated on the surface. Recording discs made from synthetic resins are apt to be charged by friction or contact with other matters and to attract dust electrostatically, leading to interference with high-fidelity reproduction. The situation is also true with high-speed vehicles. The high-speed vehicles are very likely to be charged electrostatically. The charges promote adherence of dust to the bodies, and the discharge of electricity may bring about fire with tankrolleys. In the manufacture of textile goods of synthetic fiber, the textiles are usually charged to a high electrical potential by friction or peeling in the preceeding stages. In the operation where the textiles are folded in yards, they often remain attached to the folding apparatus by electrostatic attraction, disturbing the normal operation.

To overcome the difficulty, especially in manufacturing, investigations for electrical discharging have so far been made. Electro-discharging apparatus developed by the investigations can be divided as follows:
1. Self-discharge type
2. DC voltage application type
3. AC voltage application type In either of (2) and (3), a high voltage is applied to electrodes provided with needle projections to produce corona discharge between the electrodes and charged bodies, neutralizing the charges by blowing ions that have charges of the opposite sign. Therefore, the apparatus for this purpose is eventually of a large scale and expensive because a high voltage is required. Further, an apparatus of this type is not used to remove charges on human body.

On the other hand, the discharge based on the type (1) uses pointed conductors of a small bending radius at the ends. The pointed conductors are placed oppositely to charged bodies, and a high density electric field is then formed around the pointed ends which acts to ionize the gas at the site into ion pairs. Ions having charge of opposite sign to that of the charged body are attracted to the charged body to become neutralized electrically. In other words, the pointed conductors effect neutralization of electrostatic charges on charged body without using any energy source, but by accelerating weak discharges between the pointed conductors and the charged body. The electro-discharging electrode suitable for use to this self-discharge type requires that the electrical conductors are distributed in an appropriate manner, that the conductors are in the shape of needles of a small bending radius at the ends.

Previously, an electro-discharging electrode was prepared from a textile which is woven with synthetic fibers and fine metal threads. This kind of textile, however, proved unsuitable to cloth materials, since metallic fibers are difficult to prepare and therefore of a high cost and the metal threads, less flexible than other synthetic fibers, may stick into human skin.

The present invention has succeeded in solving the above problems that accompanied previous techniques.

The present invention shall be explained in detail, referring to the drawings, in which:

FIGS. 8 and 10 show front views of the electro-discharging apparatus each carried by an annular frame;

FIG. 9 shows a cross-section along the line B – B' in FIG. 8;

FIG. 11 shows a mode in which the electro-discharging apparatus provided with a cylindrical outside frame is applied to powders or beads;

FIG. 12 shows a mode in which the electro-discharging apparatus having an annular outside frame is used when it is attached to a pipe for transporting powders;

Figure 1:
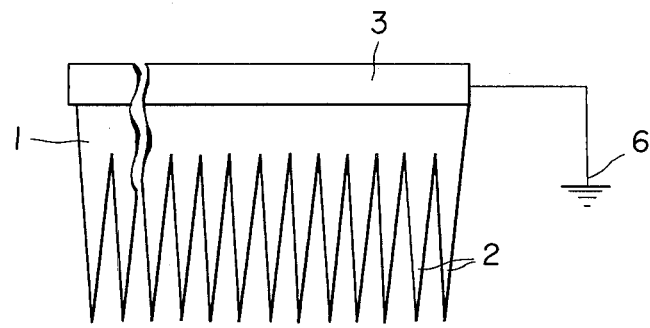
FIGS. 1 and 2 show a front view of the comb-like electro-discharging apparatus.
Figure 2:
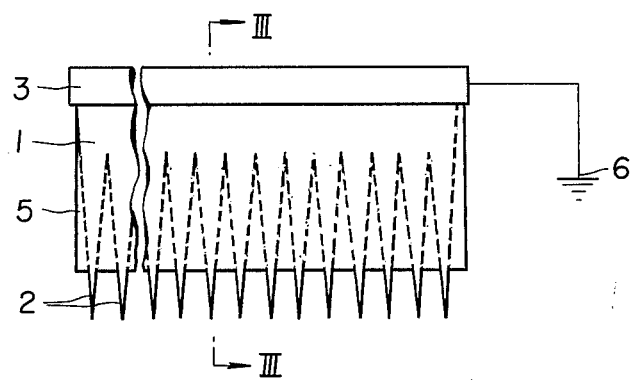
Figure 3:
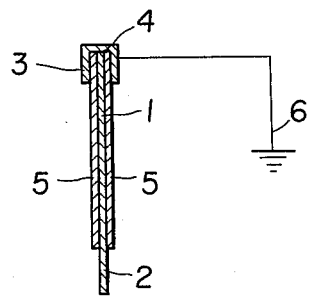
FIG. 3 is a cross-section along the line A – A' in FIG. 2.

The electro-discharging sheets to be used in the present invention are prepared by applying a composition consisting of carbon black and a high polymer resin onto a sheet material such as woven, unwoven and knit textiles and paper materials. The composition consisting of carbon black and a high polymer resin includes rubber or synthetic resin in which electroconductive carbon black is dispersed, and grafted high polymer compositions which are prepared by grafting a high polymer material in an appropriate proportion to a highly developed carbonecious structure contained in the carbon black. Carbon black to be used includes Channel black, acetylene black, furnace black, and thermal black.

When the composition is prepared by dispersing carbon black in rubber or a synthetic resin, such dispersion method using mechanical means as roller kneading and injection are not suited because of the originally low dispersion property of carbon black itself. For this reason, high polymer resin for the present use should preferably be soluble in solvents and thermoplastic. High polymer resins having such favorable properties include, for example, synthetic rubber resins such as acrylic and butadiene rubbers, polymer resins such as acrylic, polyamide, polyurethane resins and ethylene-vinyl acetate copolymer resin.

In the present invention, the said composition consisting of carbon black and a high polymer resin may be composed, as has been described above, either by simply mixing and dispersing carbon black in rubber or synthetic resin, or by grafting a high molecular substance to the highly developed structure of carbon contained in the carbon black. However, the latter composition is more suited to the purpose. The reason for it will be described below in detail.

In this invention, electro-discharging is carried out being based on the principle self-discharging, which needs no source of energy. The merit in safety is estimated highly in comparison with other methods of electro-discharge such as types of high voltage application and irradiation with electro-magnetic radiations. But the safety of this process is not perfect, since inflammation or explosion may occur when there exist inflammable gases, liquids or dust in the immediate vicinity.

If the electro-discharging electrode is composed of an electroconductive material of a homogeneous phase or an unformly dispersed composition and the end of the electrode is of a small bending radius, safe corona discharges occur at the electro-discharging electrode of the self-discharge type. Otherwise a corona discharge does not always occur. For instance, when an electroconductive material in which carbon black is mixed is used for making the electro-discharging electrode, conglomerates of carbon black often remain because of the poor dispersion of carbon black. If such an electrode is used, a glow discharge will appear of greater energy than the corona discharge, and as a result the probability for explosion becomes larger, as has been confirmed.

It may be most common to touch the electro-discharging electrode to a charged body for attaining high efficiency in electro-discharge whether the charging is of high voltage or not. But the process is the most dangerous to induce explosion. In order to be safe in electro-discharging under the said condition, resistance of the electrode must be in the range from $10^5$ to $10^7$ ohm-cm, as has been confirmed in the investigation. In case the resistance of the electrode falls out of the range, the electrode should have relatively constant resistance in view of safety. However, an electroconductive material in which carbon black is simply mixed is not always favorable to material for electro-discharging electrode of the self-discharge type, since the material shows strong orientation during passage of electricity and a significant variation of resistance appears owing to reactions with gases or vapors of chemicals present in the atmosphere.

Considering the difficulties mentioned above, the present inventors manufactured electro-discharging electrode having the following properties:

1. The resistance may be selected in the range covering from $10^5$ to $10^7$ ohm-cm from the point of safety.
2. Variation of resistance of the electro-discharging electrode was minimized in the high resistance range referred to above.
3. The electroconductive material composing the electro-discharging electrode was so composed that the particle size of each electroconductive particles results in full safety.
4. The electroconductive particles in the electroconductive materials are distributed to a high degree of uniformity.
5. Electro-discharging electrode having a high efficiency in discharging and a low rate of reverse charging is employed.

Thus, the present invention has succeeded in providing a highly safe method of electro-discharging of the self-discharge type.

Compositions of grafted high molecular substances prepared by grafting a high molecular substance in an appropriate proportion to a well-developed structure of carbon comprised in the carbon black, which form the essential part of this invention, are no more than high molecular resin compositions produced by polymerizing radical polymerizable monomers in the presence of carbon black, and the compositions are used in preparing electro-discharging electrodes which discharge electrostatic charges by the self-discharging fashion. In an electro-discharging electrode of the self-discharge type, electroconductive bodies need be dispersed in a sufficiently homogeneous way so as not to lose safety as a result of dispersion. When electroconductive carbon black is simply mixed as a filler in a resin, carbon black which is originally hydrophobic is not easy to disperse homogeneously. If dispersion is forced to be accomplished by the mechanical manner, an undesirable fact that the chain structure of carbon black is broken may appear.

To prepare a carbon grafted high molecular composition, reactions of active groups such as quinone, phenol and hydroquinone groups are utilized, instead of using mechanical dispersion, for the purpose of combining at the surface of carbon black radicals formed as a result of decomposition of an initiater for radical polymerization or polymer radicals, to convert the surface state chemically and thereupon to achieve good dispersion in organic media.

Any one among furnace black, channel black, acetylene black, thermal black and lamp black can be used for this purpose.

Free radicals that are to combine chemically with the surface of carbon black may be produced from wither peroxides or azonitriles, for instance from benzoil peroxide and azo-bis(isobutylonitrile).

The monomers which are polymerized using the radical initiater mentioned above in the presence of carbon black include those substances expressed by the general formulae,

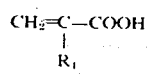

where $R_1$ is a hydrogen atom or a group of hydrocarbon containing 1 to 4 carbon atoms, and

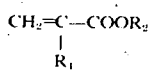

where $R_1$ has the same meaning as above and $R_2$ is a group of hydrocarbon or substituted hydrocarbon containing 1 to 12 carbon atoms. They include, for example, acrylic, methacrylic acids, esters of acrylic and methacrylic acids, styrene, acrylonitrile and methacrylonitrile.

The carbon black compositions prepared by the process of this invention are, unlike a simple mixture with carbon black, homogeneous dispersoid of very stable viscosity in the presence of solvents.

Further, there exist on the surface of carbon black a large number of functional groups amounting to $10^{14}$ to $10^{19}$ which combine with radicals. By developing polymers in a radial manner with the functional groups as center, the carbon black as electroconductive material forms extremely fine powders not more than several tens of microns of diameter without coagulating into coarse powders. When they are used for an electro-discharging electrode, they become an ideally safe electrodes for corona discharge.

The electrical resistance can be varied as desired by adjusting the proportions of carbon black and the reactive monomers. The ratio of admixture should be most desirably chosen so as to attain a resistance value $10^5$ to $10^6$ ohm-cm.

A mixture of the polymer with a cross-linking agent that has groups reactive with the reactive groups on the monomers is then applied on a base textile or formed into shape in a frame, and then converted by a thermal treatment into resistors of very little time variation. Therefore, in preparing self-discharge type electro-discharging electrodes of such resistance that the electrodes are safer against firing, admixing of the materials is possible where almost no variation of resistance occurs under a usual condition.

Desirable cross-linking agents include epoxy resin, metal compounds such as tetrapropyltitanate, amines such as melamine and triethylenetetrazine and azilidines that complete the cross-linking reactions in a relatively short time.

As a means to apply the carbon black-high molecular resin composition onto a base material in this invention, methods such as using immersion, doctor-knife coating and spraying can be selected as desired. Furthermore, the grafted carbon black-high molecular resin compositions described above could be applied by the mentioned methods onto a base material, in addition as they are, after they are further mixed with another resin. The carbon black-high molecular resin compositions thus produced, or even if they are a mere mixture of carbon black, can better be cured by thermal treatment to raise the stability and the effect to discharge the electrostatic charges.

The most suitable base materials on which the carbon black-high molecular resin compositions are applied are flexible textiles which are woven, unwoven or knit, and paper. When textiles, woven, unwoven or knit, are used as base material, the textiles may be those which contain two or more kinds of fibers of different affinities to carbon black-high molecular resin compositions in the form of liquid. In this case, the carbon black-high molecular resin compositions which have been applied onto these textiles adhere to fibers of high affinity and hardly to fibers of low affinity. As a result, the compositions are applied in a nonuniform manner, and therefore the electrical conductors can be distributed in any convenient way on electro-discharging sheets. These sheets are suitable to use for the discharge principle of the self-discharge type. Generally, fibers to which the carbon black-high molecular resin compositions have high affinity include rayon, vinylon, nylon, tetlon (all in commercial names) and natural animal and vegetable fibers. On the other hand, fibers to which little or low affinity can be expected include those of polypropylene, polyethylene and polyvinyl chloride. Textiles could be prepared from mixed-spinned threads of these different kinds of fibers of different affinities, or by woven or knit or formed into unwoven textiles from a mixture of different kinds of fiber threads.

When textiles are used for base material, those of coarse texture or netted sheets with the pore volume exceeding 55% may be used. In this case, however, care should be taken in applying the carbon black-high molecular resin composition that the pores are not blocked. Textiles for this use include woven textiles such as gauze, chiffon, ninon, voile, organzie, marquisette, mock leno, lawn, oxford, dimity, mule, muslin and poral, and various knitted textiles. Such textiles are also useful as are woven with thin threads and coarse texture. The coarseness of the texture is expressed by the relevant pore volume. Thus the pore volume is equal to $$\frac{S - S'}{S} \times 100$$

where S and S' are the real and apparent specific gravity, respectively, of the fibers and the pore volume is expressed in percentage, and further S' in g/m² is equal to $W/(1000 \times t)$ where W is weight in g/m² at the standard state and t is thickness in mm. It is desired that the fibers composing the said textiles and netted sheets have high affinity to the compositions. Thus, if coarse textiles or netted sheets of the pore volume exceeding 55% are used as base material and these materials are treated with carbon black-high molecular resin composition in such a way that the composition does not block the pores, small pores can be secured. As a result, conductors are distributed in an appropriate manner throughout the base material by the presence of the pores. The electro-discharging sheets, therefore, are best suited to the discharge principle of the self-discharge type. If the pore volume of this base material is less than 55%, the pores are too much packed for the conductor to attain appropriate distribution when the carbon black-high molecular resin composition is applied. This leads to inferior quality to discharge static charges.

The electro-discharging sheets of the present invention can be used as materials for clothes because they are flexible. Those who wear such clothes can be free from electric shock due to discharge of electrostatic charges, even if they wear undershirts of chemical fibers which are apt to generate electrostatic charges and if they are close enough to a machine that is likely to generate electrostatic charges. Further, if the electro-discharging sheets of this invention are used for carpet or wall material, they can remove electrostatic charges generated in houses and therefore eliminate fire accidents.

The electro-discharging sheets of this invention can be transformed into an electro-discharging electrode 1 by forming the sheets into appropriate shapes. Shapes having many saw-teeth 2 or blind pieces 2' are preferable. To prepare electro-discharging electrodes of these shapes, for example, the electro-discharging sheets are cut into the desired shapes or otherwise the carbon black-high molecular resin composition is applied to base materials of the desired shapes. With these shapes, the effect of discharging electricity becomes large since the saw-teeth 2 or blind pieces 2' can vibrate freely. Also the small bending radius at the end of the saw-teeth 2 or blind piece projections 2' is favorable to the purpose of electro-discharging electrodes 1 of self-discharge type. More favored, of course, is blind pieces 2' having similar saw-teeth 2 along the sides of projections.

The electro-discharging apparatus of the present invention is composed of the electro-discharging electrode 1 prepared in the way as described. The electrodischarging electrode 1 is held at the end by a holder 3 in the fixed state by means of screw, iron or adhesion. The holder 3 made of a metal, synthetic resin or wooden plate has a groove, as clearly seen in FIGS. 1, 3, 15, and 16, which holds the end of an electro-discharging electrode. When an electro-discharging electrode 1 is held by the holder 3, saw-teeth 2 and blinds 2' of electro-discharging electrodes 1 may be prepared independently from each other when they can be combined to form a series of electro-discharging electrodes. The electro-discharging electrodes thus formed are flexible, and therefore the electro-discharging electrodes can be reinforced by applying an elastic plate 5 along the side. Or the electro-discharging electrode 1 and the said elastic plate 5 may be supported at the ends by a groove 3 or adhered to the electro-discharging electrode 1. The elastic plate 5 is applied along either one or both sides of the electrodischarging electrode 1. In the electro-discharging apparatus, it is preferable to compose the apparatus in such a manner that the free end of the electro-discharging electrode 1 projects by several to several tens millimeters beyond the free end of the elastic plate 5 and the former end vibrates freely, to enhance the electrodischarging effect. The electro-discharging electrodes 1 are grounded, or connected with earth 6. When the holder 3 is made of metal, the holder 3, instead of the electro-discharging electrode, may be connected with earth 6. The elastic plate 5 is most preferably prepared of a film or a foamed film of hard or soft polyvinyl chloride, polyester, polypropylene and polyethylene, but any material, which is selected from a group consisting of paper, synthetic resins, wood and metals, could be used for the purpose if it has an appropriate degree of elasticity.

Figure 4:
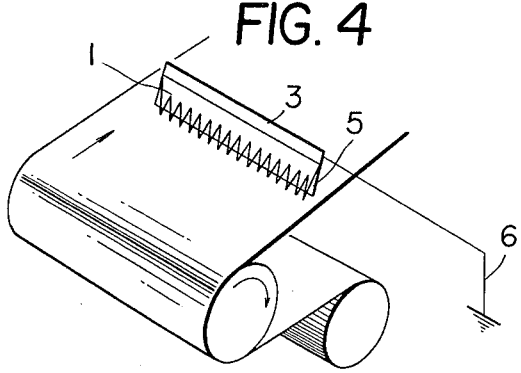
FIG. 4 shows a mode of using the comb-like electro-discharging electrode in FIG. 2.

In case where an electro-discharging electrode 1 is in the shape of saw-teeth and a holder 3 is of a straight edged one, an electro-discharging apparatus composed of the two components assumes a comb-like shape. This apparatus is used in the manner as shown in FIG. 4, where the saw-teeth 2 of the electro-discharging electrode 1 are directed perpendicularly toward the surface of a moving film of synthetic resin. The ends of the saw-teeth are so fixed that the ends lightly touch the surface of the synthetic resin film or they are only slightly apart from the same surface. In this way the electro-discharging apparatus is capable of removing the electrostatic charges on synthetic resin films continuously. By applying the elastic plate 5 along the side of the electro-discharging electrode 1, the saw-teeth 2 of the electro-discharging electrode 1 are kept in their normal position without being set in a disordered state during use nor being broken, even if the saw-teeth are arranged in small intervals between each other, leading to an elevated effect in discharging and to an extended life-time of the electro-discharging electrode 1. Another advantage of using the elastic plate 5 is in the ability of keeping the saw-teeth upright when the electrodischarging apparatus is used in the upside-down position.

Comparison of the electro-discharging apparatus provided with an elastic plate with that not provided with the same gives the following results:

|  | The ends of saw-teeth become, when they are kept in contact with | |
|---|---|---|
|  | Rotating roller | Moving film |
| Electro-discharging apparatus having no elastic plate | Remarkably disordered in 10 days | Remarkably disordered in 18 days |
| Electro-discharging apparatus provided with an elastic plate of polyvinyl chloride | Little disordered in 2 months | Little disordered in 3 months |

Remark: Textiles of synthetic fibers were used for base material.

If, on the other hand, the elastic plate 5 extends to cover the very top ends of the saw-teeth 2, the effect in electro-discharging is markedly reduced. However, the effect is not reduced at all when the top ends of the saw-teeth 2 remain uncovered as is the case with the electro-discharging electrode 1 of this invention.

A comb-shaped electro-discharging apparatus, if it is compact enough, can be attached to a disc player 7 to remove electrostatic charges on a disc 8. So far, dust adhering to the surface of a disc 8 often interfered with the high fidelity reproduction. This was due to the electrostatic charges which was generated by friction with polyethylene when the disc 8 was taken out or put into a polyethylene bag in which the disc was placed during storage. It has been a custom to remove dust on the disc 8 with a disc cleaner, which, however, did not provide a complete solution of this problem, because the surface of disc became more charged by rubbing it with the disc cleaner. In such cases, the disc 8 carried more dust on the surface when it was placed in a jacket after the disc was played on the disc player 7 than it carried before being played.

Figure 5:
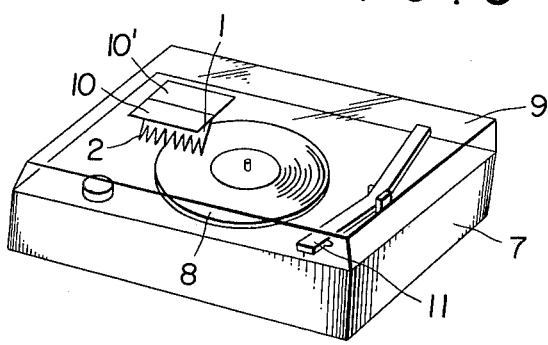
FIG. 5 shows a mode in which the comb-like electro-discharging apparatus is attached for use to a disc player.

The electro-discharging apparatus of this invention of use for cleaning discs can be attached directly to a disc player 7. The elastic plate 5 to reinforce the electro-discharging electrode may be attached either to the side of, to which the disc turns, or onto both sides of the electro-discharging electrode 1. The electrodischarging apparatus should always be set so that it always touches the disc 8. For example, the electrodischarging apparatus may be attached to a cover 9 to the disc player 7, as shown in FIG. 5. This is achieved using two pieces of paper 10 and 10' appearing in FIG. 5 by pasting edge-parts of the pieces of paper one on one side of, and the other on the other side of the electro-discharging electrode at the end, spreading the free parts of the paper on opposite directions and pasting the free parts to the inside surface of a cover 9 to the disc player 7 above the disc 8, so that the apparatus is set in a direction perpendicular to the grooves on the disc 8.

Figure 6:
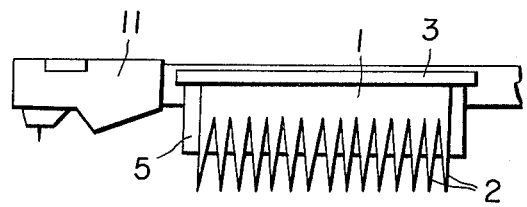
FIG. 6 shows the mode in which the comb-like electro-discharging apparatus in FIG. 2 is attached to a pick-up.
Figure 7:
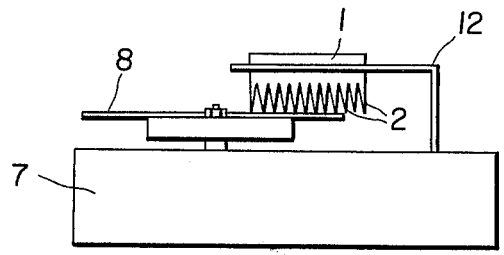
FIG. 7 shows a mode in which the comb-like electro-discharging apparatus is attached to a pick-up arm of a disc player.

Otherwise, the electro-discharging apparatus may be attached onto the side of a pick-up 11 of a player 7, as shown in FIG. 6, for example with an adhesive tape. Alternatively, an independent arm 12 may be provided to set the electro-discharging apparatus in the direction perpendicular to that of grooves on a disc 8 as shown in FIG. 7. The electro-discharging apparatus may be held on the arm 12 by being fixed with a clip, pin or screw or by being pasted with a tape. The electro-discharging apparatus may be held so that the ends of the electro-discharging electrode 1 are always kept in a position to be in touch with the surface of disc 8 or 5 to 10mm apart from the disc 8. When the disc 8 is only slightly charged or the disc 8 is small in size, it is more effective for an electro-discharging electrode 1 to touch the surface of the disc 8 at the ends. Because of flexibility, the electro-discharging electrode 1 does not mar the disc 8 even if the electrode 1 is kept in touch with the disc 8. The following table shows the results when the charge voltages developed on discs during playing were comparatively measured with and without the electro-discharging apparatus on this invention. In each case, dust on the disc was removed before use with a disc cleaner.

|  | Charge voltage | |
|---|---|---|
|  | Without electro-discharging apparatus | With electro-discharging apparatus |
| Before playing | 6 KV | 6 KV |
| After playing | 7 KV | 0.3 KV |

A disc collected more dust while it was played on a disc player which was not provided with an electro-discharging apparatus than a disc did under the same condition using a disc player provided with the electro-discharging apparatus. Frequent use of a cleaning cloth was necessary with the former disc, while a single sweep was sufficient with the latter. Namely, almost all of the electrostatic charges on a disc could be removed with this electro-discharging apparatus, and therefore this invention permitted a disc to be taken out from a storage rack or a polyethylene bag in a jacket without necessity of cleaning. Since discs are almost free from attached dust and therefore grooves are kept clean all the time, listners can enjoy full high fidelity sounds. For the same reason, grooves are not blocked by dust and needles do not skip from the groove. These effects prevent the discs and needles from being damaged. Since the electro-discharging electrode 1 on the electro-discharging apparatus is flexible enough, the electrode does not only mar a disc surface but also hands if they touch the electrode by accident.

Figure 15:
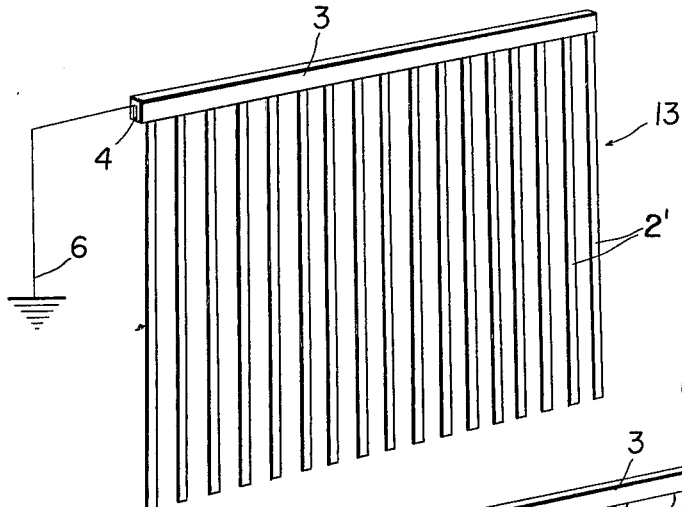
FIGS. 15 and 16 are slant views of electro-discharging blinds.
Figure 16:
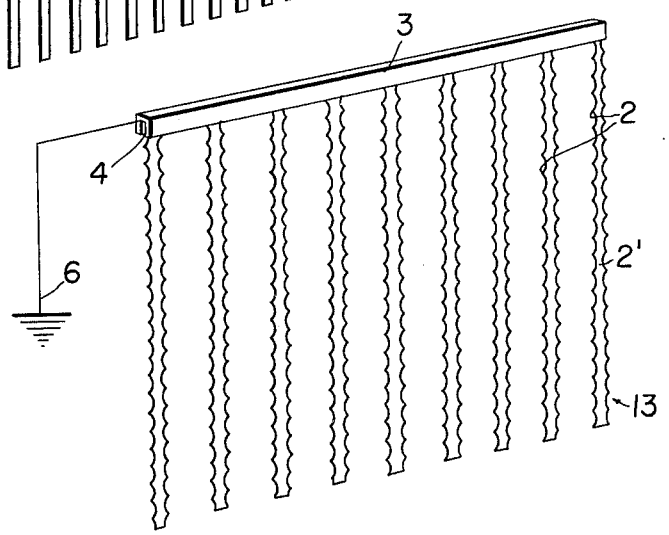

If blind-shaped electro-discharging electrodes 1 are combined with a straight holder 3, the whole assembly can be used as an electro-discharging blind 13 as shown in FIGS. 15 and 16. For example, if the assembly is hung at an entrance to a factory where high molecular resins are processed, people who pass the entrance become freed from electrostatic charges without any effort or psychological resistance, leading further to cleaning of worker's clothes. Since in this case the blind-shaped bodies 2' are flexible, the electro-discharging blind 13 allows the passage of any charged bodies of any shape including products and vehicles as well as workers and removes electrostatic charges by touching them.

The effect of this electro-discharging blind 13 on discharging electrostatic charges was confirmed as follows: An electro-discharging blind 13 was prepared by fixing a number of blind pieces 2', 3mm wide and 1,000mm long, up to the full length of an aluminum holder 3, 800mm long and 5mm × 15mm in cross-sectional area, having a groove, and the holder was grounded 6. Workers who were charged up to 6 to 8 KV after working with polyethylene films were permitted to pass through the electro-discharging blind 13, after which the voltage was reduced by discharge to 1 to 2 to KV. An electrical shock which one felt when he shook hands with these workers could be removed by use of the electro-discharging blind 13 above.

If the holder 3 is a ring frame 3' in rectangular, circular or elliptical form, an electro-discharging apparatus in ring form is obtained. In this case, the ends of electro-discharging electrode 1 are directed towards the inside of the said ring frame 3'. The electro-discharging electrode 1 is attached to the ring frame 3' with an adhesive, or by providing the frame with a groove in which each piece of the electro-discharging electrode is fitted to be held. Otherwise, the electro-discharging electrode may be held with two identical ring frames, one upper and the other lower. When the electro-discharging electrode 1 is fixed to the ring frame 3', the electro-discharging electrode may be protected from damage by breaking and marring by providing nylon piles around the both sides of the electrode 1. The electro-discharging electrode 1 for this use is prepared as follows:

An electro-discharging sheet of the same size as the ring frame 3' to which the sheet is attached is cut radially so as not to reach the edge line, or the electro-discharging sheet is cut to form triangular or fan-shaped independent saw-teeth 2. If an electro-discharging sheet of the same size as the ring frame 3' is cut radially so as not to reach the edge line, one or more sheets are attached to a single ring frame 3'. If an electro-discharging sheet is cut into independent triangular or fan-shaped saw-teeth 2, more than one sheets are attached to the inside of a single ring frame 3' so as for their ends to point to each other.

Figure 13:
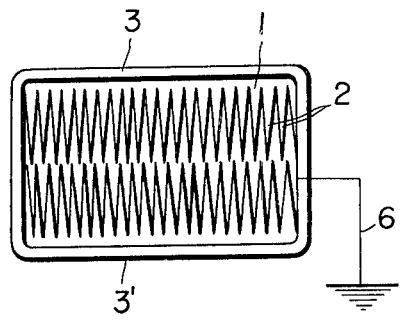
FIG. 13 shows a front view of the electro-discharging apparatus to which a rectangular outside frame is applied.

Further, as seen in FIG. 13, an electro-discharging sheet that forms an electro-discharging electrode 1 is cut so as to form a comb shape with 10 to several 10 millimeters long saw-teeth 2 and to make two lines of saw-teeth oppose to each other along an arbitrary straight line across the ring frame 3'.

The electro-discharging apparatus including a ring frame 3' as holder 3 may be used in such a manner as follows: as shown in FIG. 11 the electro-discharging apparatus is placed on a vessel in which beads or powders 14 are to be accomodated, and the beads or powders 14 are poured from a vessel 16 onto the electro-discharging apparatus. The beads or powders 14 pass through the opening of the cut on the electrode 1 by their own weights, when the beads or powders are deprived of their electrostatic charges and fall into the vessel.

The same electro-discharging apparatus can be applied to a pipe for transporting powders, as shown in FIG. 12. In this case, an electro-discharging apparatus of the same size as the inner diameter of the pipe 17 is installed close to the end of the pipe 17 where another pipe 17' is connected at a junction 18. The powders that are transported in the pipe are deprived of their electrostatic charges while they are transported. This leads to high efficiency in transportation without serious adhesion of powders to the inner wall of the pipe.

In molding preparation of powders, electrostatic charges of the powders are removed with the electro-discharging apparatus of this invention before the powders are packed in a cavity of mold that is heated to a certain temperature. Thus, a certain amount of the powder necessary to produce a product of a certain thickness can be placed in the mold by simply removing an excessive amount of the powder. Controlling the temperature of a mold in relation with the electrostatic charges of powder which has been necessary in conventional processes has become needless, and as a result products of a high quality can be obtained easily.

Figure 14:
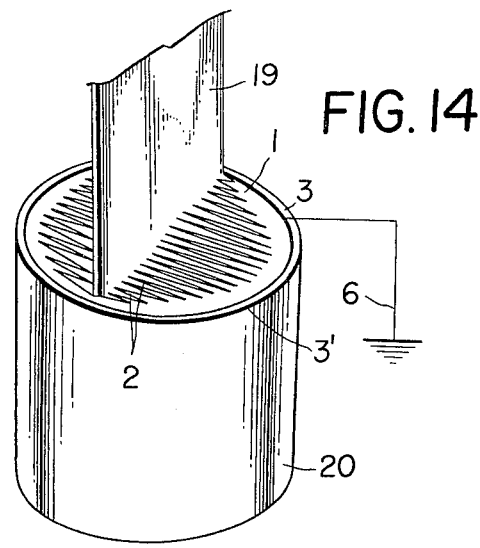
FIG. 14 shows a mode in which the electro-discharging apparatus having a cylindrical outside frame is used for electro-discharging rubber sheets.

As shown in FIG. 14, the electro-discharging apparatus of this invention can be installed at the inlet of a vessel 20 in which a solvent to dissolve rubber sheets 19. A rubber sheet 19 is disposed touches sharp ends of the electro-discharging electrode 1 when entering the inlet into the vessel 20, and is deprived of the electrostatic charges it has carried. As a result, the process to make a rubber paste in the vessel 20 can proceed safely without generating a spark that might otherwise takes place. Needless to say, the same procedure as above can be applied to remove charges on a pipe. Almost complete removal of charges on a pipe could be achieved when the pipe is continuously passed through an electro-discharging electrode 1 on an electro-discharging apparatus.

Figure 17:
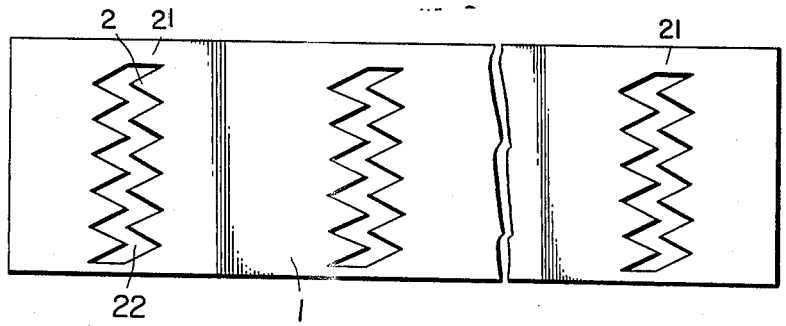
FIGS. 17 through 19 are plans of the electro-discharging apparatus in flat forms in which openings are formed with saw-tooth edges.
Figure 18:
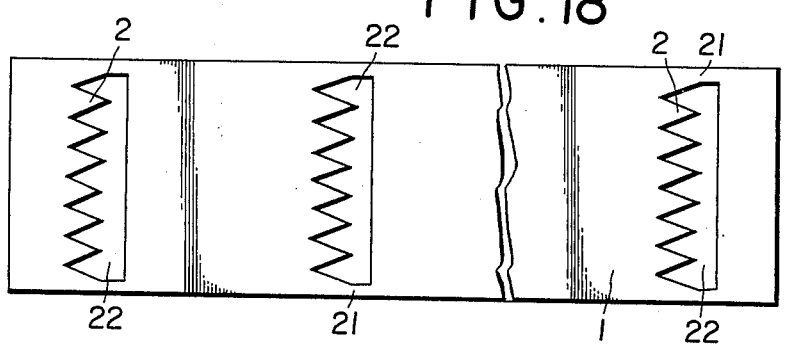
Figure 19:
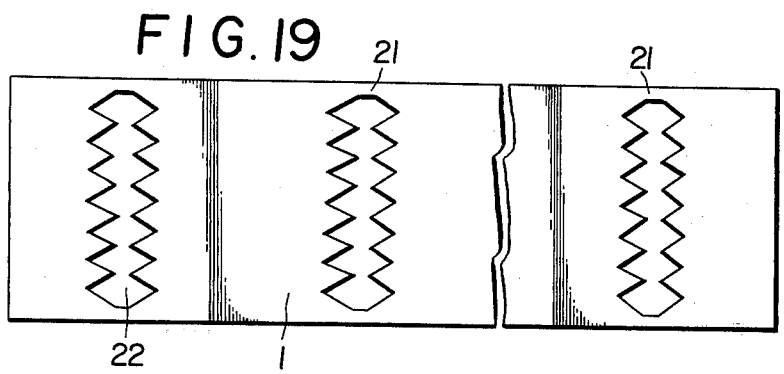
Figure 20:
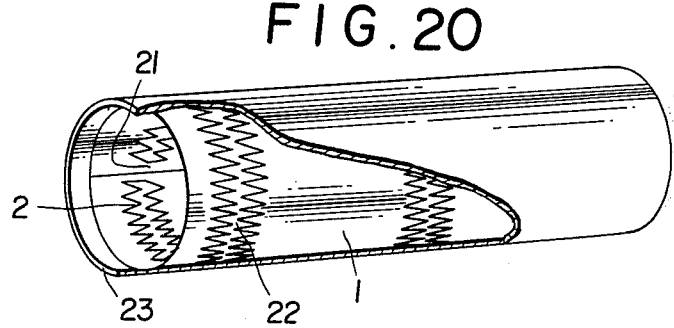
FIG. 20 shows a mode in which the electro-discharging apparatus in a flat form having openings with saw-tooth edges is applied to a pipe for transporting powders.
Figure 21:
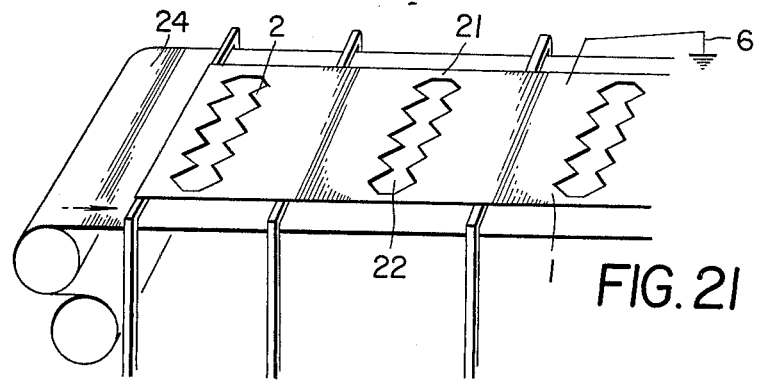
FIG. 21 shows a mode in which the electro-discharging apparatus in a flat form having openings with saw-tooth edges is applied to synthetic resin films.

The electro-discharging electrode 1 in sheet, as seen in FIGS. 17, 18 and 19, may be cut out to form a number of empty slits 22 having saw-teeth edges 2 in the sheet, leaving uncut continuous parts on the longitudinal edges of the sheet. Intervals between adjacent saw teeth, length and angle of each tooth, and disposition of the saw-tooth slits 22 may be charged so as to meet the purpose according to how charged matters are transported. In other words, an electro-discharging electrode 1 or an electro-discharging sheet should be placed to attain maximum efficiency in removing electrostatic charges that object matters carry, that is the electro-discharging sheet is installed on the inside wall of a pipe 23, as shown in FIG. 20, in which charged matters such as beads are transported, or is installed close and in parallel to a moving object such as synthetic resin films as appearing in FIG. 21. In these cases, the electro-discharging electrode 1, when installed in a pipe 23 for transporting powders, may be pasted or fastened on an inner or outer wall of the pipe 23 depending on the structure and function of the pipe and the composition of the charged matters in concern. Further, the electro-discharging electrode 1 may be installed to cover the whole or a part of the wall area of the pipe 23, and the length to which the wall is covered may be chosen accordingly, and the edges 21 of the sheets are not necessarily connected with the next one but may better be shifted to a direction on the wall. In all cases, however, the edges 21 of the sheets should be grounded 6.

In processing sheet-like charged matters such as synthetic resin films, an electro-discharging electrode is installed either above or beneath or on the side of the working bench depending on the working apparatus, where the electro-discharging electrode 1 is necessarily placed in parallel to the moving plane of the sheet-like charged matters. If necessary, ends of the saw-teeth 2 may be directed to be perpendicular to the plane of the electrodischarging electrode 1, so that the ends are directed to be also perpendicular to the moving charged matters.

Figure 22:
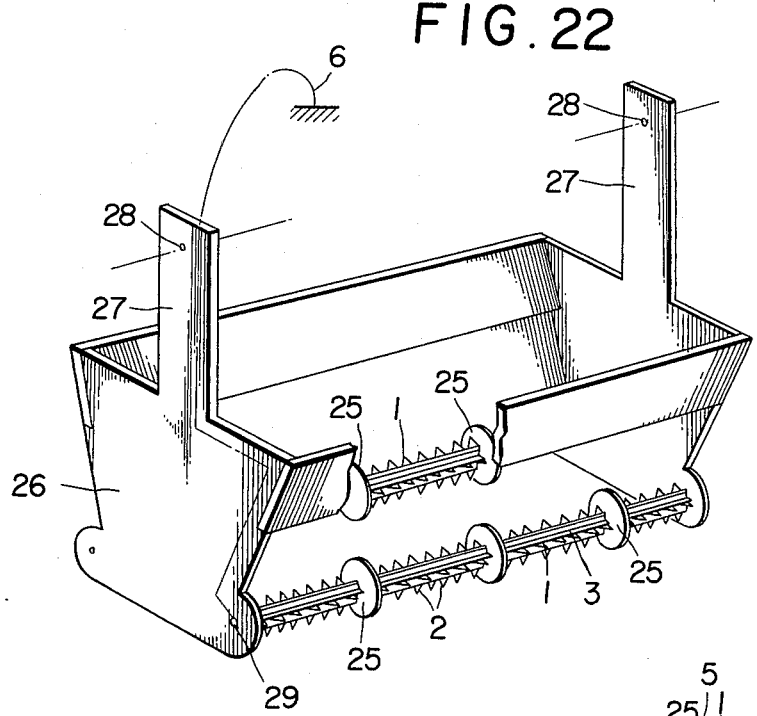
FIG. 22 is a slant view of a delivering apparatus to which the electro-discharging apparatus is attached, a portion of the outer wall being detached for illustration.
Figure 23:
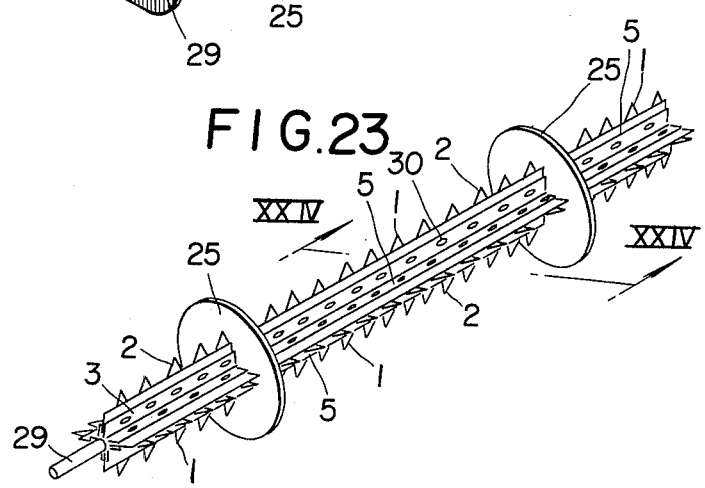
FIG. 23 is an enlarged slant view of the electro-discharging apparatus shown in FIG. 22.
Figure 25:
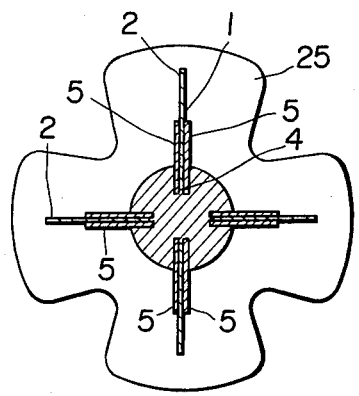
FIG. 25 shows a cross-section of a different type of the electro-discharging apparatus employed in a delivering apparatus.

In an embodiment of this invention, an electrodischarging apparatus is composed, as seen in FIGS. 22 and 23, of a holder bar 3 to which several supporter plates 25 are fixed and an electro-discharging electrode 1 of the self-discharge type attached to the said holder 3 and the ends are pointed radially around the holder 3. The electro-discharging apparatus thus formed is installed at the lower part of a delivering apparatus 26 so that the electro-discharging apparatus can be rotated freely with the holder 3 as axis, to construct a delivering apparatus provided with the discharging ability. The body of the delivering apparatus is an empty box which is wider at the upper than the lower part as shown in FIG. 22. The delivering apparatus can swing like a pendulum around supporting points 28 on the arms 27 extended upwards from the body 26. For the body 26 of the delivering apparatus, those materials of previous description can be applied. The body 26 of this delivering apparatus permits textile fabrics to pass from the upper to the lower passage through the empty parts. In this embodiment of the present invention, two electro-discharging apparatus of the self-discharge type are installed on the both sides of the bottom, so that the electro-discharging apparatus can rotate freely. FIGS. 22 and 23 show that the shafts 29 at the both ends of the holder 3 are supported by bearing for shaft 29' at the lower end of the body, where the bearings for shaft 29' composed, for example, of ball bearings ensure smooth rotation. The shafts 29 in this example are electroconductive and are connected with the electroconductive holder 3 electrically as well as mechanically. On the other hand, four electro-discharging electrodes 1, prepared from electro-discharging sheets of this invention, having many saw-teeth 2 are fixed on the holder bar 3 in a radial direction with a separating angle of 90° to each other. These electrodes 1 can be fixed to the holder 3 by inserting the former in narrow slits running along the longitudinal direction of the holder 3 and by screwing tight the slits to securely hold the electrodes. An example where a round bar is used as holder 3 is illustrated in FIG. 25. In this embodiment, the electrode 1 is made of sheets of base material to which an electroconductive high molecular resin composition has been applied. Since this electrode is flexible, it is better supported on both sides with an elastic plate 5 of rigid synthetic resin sheet so as to insure straight projection of the electrode 1. Not to reduce the efficiency of the electrode 1 in discharging, saw-teeth 2 of the electrode 1 should not be covered by the elastic plate 5. The elastic plate 5 in sheet may be fixed together with electrode 1 in the narrow slit 4 on the holder 3 to ensure tight connection between them.

Figure 24:
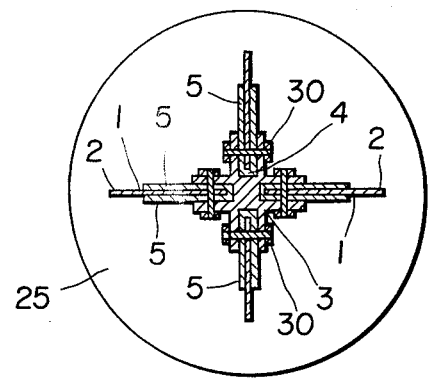
FIG. 24 is an enlarged cross-section along the line C—C' in FIG. 23.
Figure 26:
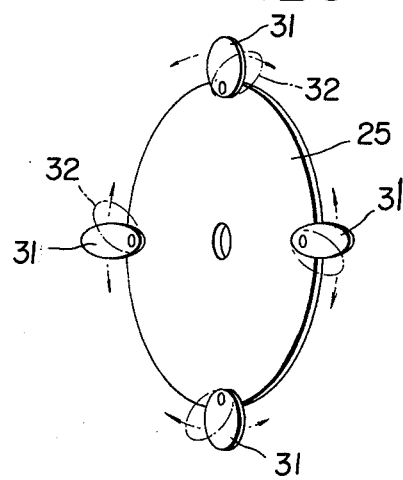
FIG. 26 is a slant view of a supporter for the electro-discharging apparatus used for the delivering apparatus.

The holder 3 penetrates several supporter plates 25 at their approximate center and the latter are located at intervals along the length of holder 3. The supporter plate 25 may be circular as in FIG. 24 or rounded star-shaped as in FIG. 25, and is required to protect the electrode 1 by being extended beyond the ends of the electrode 1. A pointed outline of the supporter plate 25 is not preferred since smooth touching with textile fabrics can not be expected. Difference between the distances from the center of shaft to the edge of the supporter and to the top end of the electro-discharging electrode 1 determines the minimum distance up to which the end of the electrode 1 approaches the textile fabrics to be treated. Since the minimum distance should be adjusted according to the voltage that the charged fabrics exhibit, the supporter plates 25 may be provided with some means to adjust the distance between the center and the edge of supporter 25, for example rotatable projections 31 may be furnished near the edge as shown in FIG. 26. Otherwise several sets of supporters 25 of different sizes may be provided and the most suitable set be used. In the example shown in FIG. 22, the distance was 1cm, and the distance between adjacent supporter plates 25 was 30cm since too great a distance between supporter plates 25 may cause the electro-discharging electrode 1 to touch the textile fabrics directly. The supporter 25 may be made from any material, so long as the material is rigid, and preferably non-electro-conductive and non-inflammable because the supporters directly touch the charged fabrics.

The electro-discharging electrode 1 is electrically grounded 6 by successive electrical connections from the electrode 1, holder 3, shaft 29 and bearing for shaft 29' to which an earth line is connected.

When textile fabrics pass through the body 26 of the delivering apparatus to which the electro-discharging apparatus of this invention is equipped, the fabrics fall through the openings at the lower part in accordance with the pendulum motion of the delivering apparatus, when the fabrics are deprived of their electrical charges, wherever the fabrics may exist in the body 26, by the electrode 1 provided at the lower part of the body. The electro-discharging apparatus rotates around its shaft when textile fabrics pass touching the supporters 25 which make the electro-discharging apparatus rotate. Since the top ends of the electrode 1 are directed perpendicular or almost perpendicular to the flat plane of passing textile fabrics, the best effect can be obtained in discharging. Further, the top ends of the electrode 1, being inside of the edge of supporter 25, do not directly touch the fabrics, which causes safe corona discharges to take place in a stable fashion. This fact leads to safe handling without fear of fire even in the presence of inflammable vapors, and neither the ends of electrode 1 nor the fabrics are marred or spoiled. Since the supporters 25 smoothly rotate themselves when they touch fabrics that pass, almost no electrostatic charge is generated due to friction.

The electro-discharging sheet of this invention can be applied regardless of shape, material and charged state of electrostatically charged matters. Since the electrode 1 is of the self-discharge type and therefore only weak discharge occurs at the electro-discharging electrode 1, there is no fear of a fire source and the possible spoilage of charged matters by discharge. Unlike previous ones, the present electro-discharging apparatus does not use metallic threads, and therefore neither human body nor charged matters are marred. Due to flexibility of the electro-discharging sheets, they can be used for clothes which are free from giving electrical shock. If they are used for carpet or wall materials, house fires caused from electrostatic discharge could be prevented. The effect in discharging can be increased when the electro-discharging electrode 1 is placed to the direction perpendicular to the surface of charged matters. The higher the voltage of charged matters, the more complete becomes the discharge, so that the electrode 1 should be placed preferably at the element of higher voltage.

EXAMPLE 1

Polyethylene adipate was reacted with diphenylmethan diisocyanate to produce polyurethane elastomer, which was then made into a 5% solution in dimethylformamide. To the resulting solution, acetylene black was added in the amount of 45 parts by weight to 100 parts by weight of polyurethane elastomer, to prepare a carbon dispersed paint.

The carbon dispersed paint thus prepared was applied uniformly onto a woven cloth of Tetlon fibers, and heated for 30 min. at 180°C, to prepare an electro-discharging sheet. The said sheet was cut into 10 × 50 cm rectangular pieces. One side of the rectangular sheet was cut into a blind-like matter with intervals of 1 mm to become an electro-discharging electrode, and the other side of the sheet was held between two aluminum holders, to prepare an electro-discharging apparatus.

The electro-discharging apparatus thus prepared was attached to a high molecular substance processing machine through which polyethylene films ran at a rate of 20 m per minute, and amounts of electrostatic charges on polyethylene films were measured before and after the discharging. Results are shown in Table 1.

EXAMPLE 2

One hundred and fifty parts (by weight) of oil furnace black, 75 parts of butyl acrylate, 25 parts of acrylic acid and 500 parts of cyclohexanone were placed in a four-necked flask. The mixture was reacted for 5 hours at 90°C using azo-bis(isobutylonitrile) as initiator for polymerization, to prepare a solution of grafted carbon black resin composition. This solution was applied uniformly onto a woven cloth of Tetlon fibers and heated at 150°C for an hour, to prepare an electro-discharging sheet. This sheet was cut into 10 × 50 cm rectangular pieces. One side of the rectangular piece of sheet was cut into a blind-like matter with intervals of 1 mm, to prepare an electro-discharging electrode, and the other side of the piece was held with two aluminum supporters, to obtain an electro-discharging apparatus. The electro-discharging apparatus was attached to a high molecular substance processing machine through which polyethylene films ran at a rate of 20 m per minute, and the amounts of electrostatic charges of polyethylene films were measured before and after the discharging treatment. Results are shown in Table 1.

polymer. Then 11 g of tetrapropyltitanate was added. The resulting solution was applied by dipping method to (A) a cloth of Tetlon fibers and (B) a mixed-woven cloth made of Tetlon and polypropylene fibers in the ratio of 55 : 45, to contain 45 g/m$^2$ of solid matters. Solvent was evaporated and then the clothes were treated by heating at 150°C for 15 hours for curing.

A polyethylene film which had been charged electrostatically was passed on, while being in contact with, the clothes (A) and (B) separately. Electrostatic voltages were measured after the passage and results are shown in the table below. It is seen from the table that (B) in this experiment is more excellent in removing electrostatic charges.

| Voltage of charged matter | A | B |
|---|---|---|
| + 10 KV | + 6 KV | + 1 KV |
| + 20 KV | + 5 KV | 0 |
| + 30 KV | + 3 KV | 0 |

EXAMPLE 4

| | |
|---|---|
| Oil furnace black | 60 g |
| Acrylic acid | 11 g |
| Butyl acrylate | 39 g |
| Cyclohexanone | 280 g |

A mixture consisting of above components was treated using azo-bis(isobutylonitrile) as initiator for polymerization, to obtain a solution of carbon grafted polymer. Then 11 g of tetrapropyltitanate was added. The resulting solution was applied uniformly by dipping method separately to (C) a fine-textured cloth having the pore volume of 20% and (D) a coarse-textured cloth having the pore volume of 70%, each of Tetlon fibers. The solvent was evaporated and the clothes were heated for 6 hours at 200°C for the sake of curing.

A polyethylene film that had been charged electrostatically was run while the film being in contact with the above clothes separately. Voltages before and after the treatment are shown in the table below. It is con-

Table 1

| Distance between electrode and charged matter | Voltage before discharging treatment | Example 1 | Example 2 | Metal bar |
|---|---|---|---|---|
| 0 mm | + 30,000 Volt | + 50 Volt | − 10 Volt | +25,000 Volt |
| 10 mm | + 30,000 Volt | + 1000 Volt | 0 Volt | +30,000 Volt |
| 30 mm | + 40,000 Volt | + 1000 Volt | + 300 Volt | + 40,000 Volt |

EXAMPLE 3

| | |
|---|---|
| Oil furnace black | 60 g |
| Acrylic acid | 11 g |
| Butyl acrylate | 39 g |
| Cyclohexanone | 280 g |

A mixture consisting of above components was treated using azo-bis(isobutylonitrile) as initiator for polymerization, to obtain a solution of carbon grafted firmed that (D) is more excellent in removing electrostatic charges.

| Initial voltage of charged matter | C | D |
|---|---|---|
| + 10 KV | + 6 KV | + 2 KV |
| + 20 KV | + 4 KV | 0 |
| + 30 KV | + 3 KV | 0 |

EXAMPLE 5

| | |
|---|---|
| Oil furnace black | 14 g |
| Acrylic acid | 25.3g |
| Decyl acrylate | 74.7g |
| Azo-bis(isobutylonitrile) | 6.5g |
| Cyclohexanone | 450 g |

A mixture consisting of above components was placed in a reaction vessel and reacted for 4 hours at the reaction temperature of 90°C. The carbon black composition thus obtained was so dispersion-stable that no precipitate was formed even by use of a centrifuge.

Subsequently butylated melamine was added to the above solution in the rate of 63.3 g to 1,000 g of the solution. The resulting solution was applied for coating to a very thin cloth of heat-resistant synthetic fibers, and heated, after dried, for 60 min. at 200°C, to prepare an electroconductive sheet.

This sheet was cut into a strip of 50 cm electrode length and 1 cm space between electrodes. Electrodes were fixed at both ends of a strip and a voltage of 100 V was applied for 1,000 hours. Resistance values before and after the voltage application differed by only 3%. Thus almost no variation of resistance was confirmed.

The same sheet was kept immersed for 4 hours at room temperature in solutions of hydrochloric acid, sodium hydroxide, methyl alcohol, methylethylketone, toluene, petroleum and dioctylphthalate separately. Almost no change in the resistance value was observed, and satisfactory resistance against chemicals was confirmed.

Then an electro-discharging electrode having sharp-cut saw-teeth was prepared from the above sheet, and held with an aluminum supporter which was grounded to earth. This was used to remove charges on a polyethylene film that had been charged electrostatically up to 10 to 80 KV. In each case discharging to zero voltage was accomplished by merely adjusting the distance between the electro-discharging electrode and the charged matter. Relationship between the distance and the voltage was as follows:

age by merely adjusting the distance between the electro-discharging electrode and charged matters.

In a further experiment, the maximum electrical charges that was discharged was measured as a function of distance at which the electro-discharging electrode was placed using a synchroscope. For reference, a previous type electro-discharging electrode which was prepared by simply mixing carbon black was submitted to the same experiment for the sake of comparison.

Experiments using the electrode of this invention showed nearly constant discharged electricity regardless of difference in distance from charged matters, while parallel experiments using the electrode prepared by mere mixing carbon black showed rapid increase in maximum discharged electricity as the distance decreased, showing an inferior property with regard to safety. In addition, it should be understood that, when the energy at the maximum discharged electricity becomes equal to or larger than the minimum energy with which a substance becomes inflammable, a firing accident might occur. Incidentally, the minimum value for hydrogen gas is $5 \times 10^{-9}$ coulomb. In this respect the present invention offers an entirely safe process.

Discharged electricity as a function of distance from an electrode.

| Specimen | | Present example | | | Electro-discharging electrode prepared by mere mixing carbon black | | | |
|---|---|---|---|---|---|---|---|---|
| | Resistance | $4 \times 10^5$ ohm | | | $3 \times 10^2$ ohm | | | |
| | Voltage | 20 KV | | 60 KV | 20 KV | | 60 KV | |
| Distance between electrode and charged matter | 0 mm | 1.4 | $\times 10^{-10}$ coulomb | 1.3 $\times 10^{-10}$ coulomb | 150 | $\times 10^{-10}$ coulomb | 130 | $\times 10^{-10}$ coulomb |
| | 10 mm | 1.3 | " | 1.2 " | 45 | " | 40 | " |
| | 20 mm | 1.3 | " | 1.2 " | 20 | " | 18 | " |
| | 40 mm | 1.2 | " | 1.2 " | 15 | " | 12 | " |
| | 60 mm | 1.2 | " | 1.1 " | 8 | " | 7 | " |
| | 80 mm | 1.1 | " | 0.9 " | 6 | " | 5 | " |

EXAMPLE 6

In a process similar to that in Example 5, 7 kinds of electro-discharging electrodes of different electrical resistance were prepared by changing the ratio of carbon black to monomers.

Subsequently charged electricity was measured and the correlation of the amount with the resistance values was examined. As a result, it was confirmed that such electrodes having a resistance between $10^5$ to $10^7$ ohms are capable of discharging and excellent in safety.

Comparison of the results with those in Example 5 shows that any electrode of this invention is better in safety by an order of magnitude than electrodes of previous processes having the same value of resistance.

| Voltage charged | −10 KV | −20 KV | −40 KV | −60 KV | −80 KV |
|---|---|---|---|---|---|
| Distance between charged matter and electrode | 0 cm | 1 cm | 2 cm | 3.5 cm | 4.5 cm |
| Residual voltage | 0 | 0 | 0 | 0 2 KV | 0 2 KV |

The result above demonstrates that discharging can be efficiently achieved independently of charged voltage Discharged quantity of electricity as a function of resistance Distance between electrode and charge matter : 0 (in contact)

| Resistance (ohm) | Maximum discharged quantity of electricity | |
| --- | --- | --- |
| | Voltage applied 20 KV | 60 KV |
| $3 \times 10^2$ | $22 \times 10^{-10}$ coulomb | $19 \times 10^{-10}$ coulomb |
| $6 \times 10^3$ | 18 | 16 |
| $7 \times 10^4$ | 11 | 10 |
| $4 \times 10^5$ | 1.4 | 1.3 |
| $6 \times 10^6$ | 1.2 | 1.2 |
| $5 \times 10^7$ | 1.1 | 1.0 |
| $4 \times 10^8$ | 0.9 | 0.9 |

What is claimed is:

1. An electro-discharging apparatus of a self-discharge type comprising a flexible electro-discharging electrode provided with a number of projecting portions and including a flexible sheet having a flexible base material and an electrically conductive coating disposed thereon, said base material including woven, unwoven and knitted cloths and paper, said coating composed of a carbon black high molecular resin composition.

2. An electro-discharging apparatus as claimed in claim 1, wherein said number of projecting portions of said electrode comprise a saw-toothed shape.

3. An electro-discharging apparatus as claimed in claim 1, wherein said electrically conductive coating includes a cross-linking agent.

4. An electro-discharging apparatus as claimed in claim 1, wherein said base material is a base cloth woven with several kinds of fibers having differing properties in dyeing affinity.

5. An electro-discharging apparatus as claimed in claim 1, wherein said base material is coarsely woven base cloth having a volume which is more than 55% porous upon which is applied throughout with an electrically conductive coating composed of a grafted carbon black molecular resin composition in such a manner so as to avoid blockage of the pores of the base cloth.

6. An electro-discharging apparatus as claimed in claim 2, wherein said apparatus is provided with an electro-discharging electrode composed of a flexible sheet having an opening, the rim of said opening being formed in a saw-tooth shape so as to constitute a saw-toothed portion.

7. An electro-discharging apparatus as claimed in claim 2, wherein an elastic plate is affixed to one side of said electro-discharging electrode.

8. An electro-discharging apparatus as claimed in claim 7, wherein the saw-toothed portion of said electro-discharging electrode projects beyond one end of the elastic plate.

9. An electro-discharging apparatus as claimed in claim 1, wherein said electro-discharging electrode is grasped by a holder body.

10. An electro-discharging apparatus as claimed in claim 7, wherein said electro-discharging electrode and said elastic plate are grasped together by a holder body.

11. An electro-discharging apparatus as claimed in claim 9, wherein said holder body has a cross-sectional profile of a U shape, the inner portion of said U forming a groove.

12. An electro-discharging apparatus as claimed in claim 1, wherein said projecting portions of said electrode are formed as vertical blinds.

13. An electro-discharging apparatus as claimed in claim 12, wherein said blind shaped electro-discharging electrode is grasped by a holder body.

14. An electro-discharging apparatus as claimed in claim 28, wherein said holder body is formed in an annular shape.

15. An electro-discharging apparatus as claimed in claim 2, wherein electro-discharging electrodes having saw-toothed portions are projected radially from a holder member, and said holder member being provided with a plurality of overhanging flange plates so as to be rotatable about the axis of said holder member.

16. An electro-discharging apparatus of a self-discharge type comprising a flexible electro-discharging electrode and a holder therefor, said electrode being provided with a number of projections consisting of a flexible sheet, said flexible sheet having a flexible base material and an electrically conductive coating being disposed thereon, said base material including woven, unwoven and knitted cloths and paper, said coating composed of a carbon black high molecular resin composition.

* * * * *